United States Patent Office 3,637,563
Patented Jan. 25, 1972

3,637,563
PREPARATION OF HIGH SOLIDS POLYMER AQUEOUS EMULSIONS
Ray C. Christena, Wichita, Kans., assignor to Celanese Corporation, New York, N.Y.
No Drawing. Continuation-in-part of application Ser. No. 725,539, Apr. 30, 1968, which is a continuation-in-part of application Ser. No. 657,895, Aug. 2, 1967. This application May 20, 1969, Ser. No. 826,254
Int. Cl. C08f 45/24
U.S. Cl. 260—29.6 R          32 Claims

ABSTRACT OF THE DISCLOSURE

High solids aqueous polymer emulsions are produced by first admixing a surfactant with one or more polymerizable monomers each containing at least one olefinic double bond, together with an amount of water corresponding to between about 6% and about 25% by weight based on the total weight of monomer employed. The resultant pre-emulsion is then added to an aqueous medium and polymerized in the reactive presence of a free radical polymerization catalyst.

CROSS-REFERENCES TO RELATED APPLICATIONS

This application is a continuation-in-part of copending application Ser. No. 725,539, filed Apr. 30, 1968 now abandoned, which in turn is a continuation-in-part of copending application Ser. No. 657,895, filed Aug. 2, 1967 now abandoned.

BACKGROUND OF THE INVENTION

This invention relates to polymer emulsions. More particularly, it relates to a novel process for preparing stable aqueous polymer emulsions of low viscosities and having higher solids content than were hitherto obtainable using conventional emulsion polymerization techniques.

Aqueous emulsions containing various homopolymers and copolymers, e.g., homopolymers and copolymers of vinyl esters, homopolymers and copolymers of lower alkyl acrylates and lower alkyl methacrylates, such as ethyl acrylate and methyl methacrylate, and the like, have been known for many years. The procedures used to prepare such polymer emulsions generally involve adding, with rapid stirring, one or more ethylenically unsaturated monomers to water which contains or to which is added, either simultaneously or subsequently, surfactants or emulsifying agents, a polymerization catalyst or initiator and, in many cases, a protective colloid-forming substance. This mixture is then heated to polymerization temperature with continued stirring, and held at that temperature unil substantially complete polymerization of the monomer or monomers has occurred. The resulting polymer emulsion, upon cooling and filtering, can be used in many domestic and industrial applications, such as in paints or other coating compositions (e.g., paper coatings and textile-treating compositions), in adhesives or binders, in caulking compositions, and the like, depending on the particular polymers involved and the properties of the emulsions containing them.

Acrylic polymer emulsions, and particularly those which contain polymers prepared using a predominant amount of a lower alkyl acrylate together with minor amounts of other comonomers, e.g., styrene, alkyl methacrylates, higher alkyl acrylates, acrylic acid or methacrylic acid, vinyl halides and vinylidene halides, and the like, have come to be used in ever increasing amounts in recent years in the so-called water-base paints. Films of such polymers normally exhibit excellent appearance and durability, particularly when pigmented, and paints or other coating compositions containing them will generally adhere satisfactorily to a wide variety of substrates.

However, one difficulty heretofore associated with polymer emulsions, in general, is that it has not been possible to prepare such emulsions on a commercial scale having solids content in excess of about 50% and which are of sufficiently low viscosity for convenient handling as well as of sufficient "shelf stability" to permit their use in paints or other coatings.

Accordingly, there is considerable commercial interest in high solids polymer emulsions. Such emulsions would result in savings in shipping and storage costs due to their decreased water content. They would also permit savings in production costs, both in preparing the emulsions themselves, inasmuch as there is a considerable increase in emulsion productivity as the solids content increases, and in using them, since coatings or films of any desired thickness could be applied in fewer passes.

In addition, paint manufacturers generally prefer to have as much of the total water content of their paint formulation as possible available for preparing the pigment dispersions which will be mixed with the polymer emulsion. High solids polymer emulsions will obviously tie up less of the total available water than the corresponding conventional emulsions.

SUMMARY OF THE INVENTION

Therefore, it is an object of the present invention to provide an improved process for preparing polymer emulsions.

It is also an object to provide an improved process for preparing aqueous polymer emulsions, particularly aqueous acrylic copolymer emulsions.

A further object of the present invention is to provide aqueous acrylic polymer emulsions having both acceptable viscosities and shelf stabilities as well as higher solids content than heretofore commercially obtainable.

These and other objects of the present invention, as well as the advantages thereof, can be had by reference to the following detailed description and claims.

The above objects are achieved according to the present invention by forming a "pre-emulsion" by combining:

(a) one or more polymerizable monomers each containing at least one olefinic double bond;

(b) sufficient amounts of at least one surfactant to provide a stable "pre-emulsion" and subsequently, a stable polymer emulsion; and (c) water is an amount corresponding to between about 6% by weight and about 25% by weight, based on the total weight of the monomer in the pre-emulsion. The monomer or monomers used must be capable of not only polymerizing but must also be capable of forming a stable aqueous emulsion, i.e., a stable emulsion in which water is dispersed as a discontinuous phase in a continuous phase of monomer or mixture of monomers.

The pre-emulsion prepared above is then added, incrementally or continuously, to a polymerization reaction medium comprising an amount of the water which is necessary to obtain the solids content desired in the polymer emulsion product, and a portion of a free radical polymerization catalyst in amounts sufficient to initiate the polymerization of at least one or more of the polymerizable monomers in the pre-emulsion. The reaction medium is maintained at a temperature which will initiate and maintain the polymerization reaction. The rate of addition of the pre-emulsion is controlled to provide substantially complete conversion (as close to 100% as possible) of the monomer to the polymer as the pre-emulsion is added. In other words, the rate of conversion of pre-emulsion to polymer emulsion is maintained approximately equal to the rate of addition of pre-emulsion to the polymerization reaction medium.

The polymerization of the monomer or monomers is conducted in the presence of a free radical polymerization catalyst which is present or added in sufficient amounts to provide substantially complete monomer conversion (as colse to 100% as possible) to produce a polymer emulsion having total solids content in the range from about 50% to about 75% or higher by weight, and preferably in the range from about 60% to about 75% by weight. The high solids polymer emulsions produced according to the present invention have workable viscosities, good shelf stability, and are higher in solids content than those obtainable by any hitherto known techniques.

It is a feature of the present invention that, in the instant polymer emulsions, the organic component (i.e., the polymer) is dispersed as a discontinuous phase in a continuous phase of water, whereas in the pre-emulsions, the water is dispersed as a discontinuous phase in a continuous phase of monomer.

The high solids polymer emulsions prepared by the novel process of the present invention contain homopolymers or copolymers derived from polymerizable ethylenically (i.e., olefinically) unsaturated monomers, preferably monomers containing at least one $H_2C=C<$ substituent.

Homopolymers which can be produced by this process include those derived from unsaturated monomers capable of forming stable aqueous emulsions and capable of self-polymerizing in aqueous media. Examples of such monomers include styrene, alkyl acrylates, alkyl methacrylates, acrylic or methacrylic acid, vinyl and vinylidene halides, allyl esters of saturated monocarboxylic acids, vinyl esters, vinyl ethers, dialkyl esters of monoethylenically unsaturated dicarboxylic acids, ethylenically unsaturated monocarboxylic and polycarboxylic acids as well as available anhydrides, nitriles, unsubstituted and substituted (including N-substituted) amdies of said acids, and the like. A more detailed descripiton of the specific compounds suitable for use as monomers for homopolymerization are included hereinafter in the lists of compounds suitable for use as copolymers. It is noted that one skilled in the art can readily determine which compounds of the classes described above can be homopolymerized and which compounds can be used to produce copolymers. Especially preferred, however, are the monomers described above and hereinafter utilized in the production of copolymers having outstanding properties in their ultimate uses.

At least one major monomer component of these polymers will usually be an alkyl acrylate or methacrylate, and particularly the former. Ordinarily, the alkyl acrylate or methacrylate will be one wherein the alkyl group contains less than about 10 carbon atoms, such as methyl acrylate, ethyl acrylate, propyl acrylate, n-butyl acrylate, isobutyl acrylate, 2-ethylhexyl acrylate, methyl methacrylate, ethyl methacrylate, isobutyl methacrylate, 2-ethylhexyl methacrylate, and the like.

In addition to being copolymerized with each other, the aforementioned monomeric acrylates and methacrylates can also be copolymerized with one or more different monomers. In fact, for many industrial applications, copolymers derived from monomers containing functional groups other than esters, and especially functional groups which provide sites for subsequent cross-linking, are preferred.

Included among these different comonomers are higher alkyl esters of acrylic and methacrylic acid, i.e., those having from 10 to 22 or more carbon atoms in the ester moiety, such as decyl acrylate, decyl methacrylate, hendecanyl methacrylate, lauryl methacrylate, tridecanyl methacrylate, myristyl acrylate, myristyl methacrylate, pentadecanyl methacrylate, arachidyl methacrylate, behenyl methacrylate, 10-methyl hendecanyl methacrylate and 2-ethyl-lauryl methacrylate.

Derivatives of vinyl alcohol e.g. aliphatic vinyl esters such as vinyl formate, vinyl acetate vinyl propionate, vinyl butyrate vinyl isobutyrate vinyl valerate, vinyl caproate, the vinyl ester of Versatic acid and the like, can be employed in amounts ranging up to about 90% or more by weight, based on the total weight of monomers used, as can allyl esters of saturated monocarboxylic acids (including monocarboxylic acids having polymerizably non-reactive unsaturation), e.g., allyl acetate, allyl propionate and allyl lactate, with the latter esters generally being used in relatively small amounts together with larger amounts of one or more different vinyl monomers, and especially aliphatic vinyl esters such as vinyl acetate.

Aliphatic vinyl ethers such as methylvinyl ether, ethylvinyl ether and n-butylvinyl ether can also be employed, as can vinyl ketones, such as methylvinyl ketone, ethylvinyl ketone and iso-butylvinyl ketone, and dialkyl esters of monoethylenically unsaturated dicarboxylic acids, e.g., diethyl maleate, dibutyl maleate, dioctyl maleate, diisooctyl maleate, dinonyl maleate, diisodecyl maleate, ditridecyl maleate, dipropyl fumarate, dibutyl fumarate, dioctyl fumarate, diisooctyl fumarate, didecyl fumarate, dibutyl itaconate and dioctyl itaconate.

Polymerizable, ethylenically unsaturated monocarboxylic and polycarboxylic acids as well as the available anhydrides, nitriles, unsubstituted amides and substituted (including N-substituted) amides of said acids, can also be employed as comonomers.

More particularly, monoethylenically unsaturated monocarboxylic acids such as acrylic acid, methacrylic acid, ethacrylic acid and crotonic acid, monoethylenically unsaturated dicarboxylic acids such as maleic acid, fumaric acid, itaconic acid and citraconic acid, and monoethylenically unsaturated tricarboxylic acids such as aconitic acid can be employed, as can their halogen-substituted (e.g., fluoro-, chloro-, and bromo- substituted) derivatives, e.g., alpha-chloroacrylic acid, and the anhydrides of these acids, if available, e.g., maleic anhydride, citraconic anhydride, and the like.

Among the corresponding nitriles of such acids which can be employed are acrylonitrile, alpha-chloro-acrylonitrile and methacrylonitrile. Among the amides of such acids which can be employed are unsubstituted amides such as acrylamide, methacrylamide and other alpha-substituted acrylamides, and N-substituted amides obtained by conventional reaction of the amides of the aforementioned mono- and poly- carboxylic acids with an aldehyde such as formaldehyde or the like, to form, e.g., N-methylolacrylamide, N - methylolmethacrylamide, alkylated N-methylolacrylamides and N-methylolmethacrylamides such as N-methoxymethylacrylamide, N-methoxymethylmethacrylamide, and the like.

Amino monomers which can be used include substituted and unsubstituted aminoalkyl acrylates, hydrochloride salts of amino monomers, and methacrylates such as aminomethylacrylate, beta - aminoethylacrylate, aminomethylmethacrylate, beta - aminoethylmethacrylate, dimethylaminomethylacrylate, beta - dimethylaminoethylacrylate, dimethylaminomethylmethacrylate, and the like, while among the hydroxy-containing monomers which can be used are beta-hydroxyethylacrylate, beta-hydroxypropylacrylate, gamma-hydroxypropylacrylate, beta-hydroxyethylmethacrylate, and the like.

Typical "cross-linking monomers," i.e., monomers which are known to provide sites for subsequent cross-linking, such as pentaerythritol, hydroxyalkylacrylic esters, and the like, can be used in the present process in amounts ranging from about 0.1% to about 6% by weight, based on the total weight of monomers employed.

Furthermore, although aqueous copolymer emulsions wherein the copolymer contains one or more alkyl acrylates or methacrylates containing less than 10 carbon atoms in the alkyl moiety as the predominant monomer component (i.e., at least about 50% by weight, based on the total weight of monomers employed) are the preferred copolymer emulsions prepared by the novel process of the present invention, these alkyl acrylates or methacrylates can be used in amounts ranging from about 5% to about 100% by weight, based on the total weight of monomers employed.

Thus, the novel process of the present invention is not intended to be limited to the preparation of aqueous emulsion copolymers containing predominant amounts of alkyl acrylates or methacrylates, or to the preparation of copolymers wherein only those monomers described above are copolymerized with these alkyl acrylates or methacrylates. Aside from the fact that homopolymers can be produced, these alkyl acrylates and methacrylates can, as previously indicated, be present in less than predominant amounts, and monomers not specifically mentioned hereinabove can also be employed. Thus, for example, styrene and substituted styrenes can be copolymerized with these alkyl acrylates and methacrylates, and copolymers can be prepared which contain one or more of these alkyl acrylates and methacrylates together with one or more different comonomers, e.g., vinyl acetate, wherein the latter monomer or monomers is present in amounts greater than about 50% by weight, based on the total weight of monomers employed.

Further examples of monomers suitable for use in the present invention include monomers which are useful in the production of homopolymeric and copolymeric synthetic rubbers, e.g., the various 1,3-butadienes such as 1,3-butadiene, isoprene, chloroprene, piperylene, 2,3-dimethyl-1,3-butadiene, and the like. If desired, the monomeric material used in preparing the pre-emulsions of this invention can be a mixture of a 1,3-butadiene such as 1,3-butadiene or chloroprene with one or more monomers capable of forming copolymers therewith. For example, the monomeric material can be a polymerizable mixture containing up to 50%, or more in some instances, of a compound which contains a $CH_2{=}C{=}$ group wherein at least one of the disconnected valences attaches to an "electroactive" substituent, i.e., a substituent which substantially increases the electrical dissymmetry or polar character of the molecule. Examples of compounds containing the aforementioned substituent are the aryl olefins, such as styrene and vinyl naphthalene; the alpha methylene carboxylic acids and esters, nitriles and amides thereof, such as acrylic acid, methacrylic acid, methyl methacrylate, acrylonitrile, methacrylonitrile and methacrylamide; isobutylene; methylvinyl ether; and methylvinyl ketone. In some instances, the monomeric material can be a single compound containing a $CH_2{=}C{=}$ substituent or a mixture of such compounds. The polymerizable monomeric materials suitable for use in the invention can be referred to herein as being selected from the group consisting of conjugated diolefins homopolymerizable to produce polymers, e.g., chloroprene, and mixtures of conjugated diolefins and monoethylenically unsaturated monomers which are copolymerizable to form rubbery homopolymers or copolymers, e.g., mixtures of butadiene and styrene.

The polymerization procedure of the invention can involve the use of one or more micelle-forming surfactants of the same type as employed in conventional emulsion polymerization techniques.

In forming the monomer pre-emulsion of the present invention, any anionic or non-ionic surfactant (which can also be termed an emulsifying agent, a dispersing agent, or a wetting agent), or mixtures thereof, which are useful in preparing conventional polymer emulsions can be used.

Examples of surfactants for the butadiene or synthetic rubber-type polymers are the fatty acid soaps and especially water-soluble, long chain fatty acid soaps such as sodium or potassium laurate, myristate, palmitate, oleate, stearate, and the like. The water-soluble sodium or potassium soaps of tall oil and the rosin soaps, including disproportionated rosin soaps, also can be used. If desired, a secondary emulsifier can be present, which can be a conventional synthetic detergent. Examples of secondary emulsifiers include the alkali metal sulfonates derived from aryl sulfonic acids, e.g., sodium alkyl-naphthalene sulfonates.

Among the non-ionic surfactants suitable for use in the present invention are polyethers, e.g., ethylene oxide and propylene oxide condensates in general, which include straight- and branched-chain alkyl and alkylaryl polyethylene glycol ethers and thioethers and polypropylene glycol ethers and thioethers, and more particularly substances such as the "Igepals," which is a trademark of General Aniline and Film Corporation denoting members of a homologous series of alkylphenoxypoly-(ethyleneoxy)ethanols, which series can be represented by the general formula

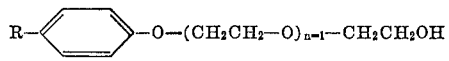

wherein R represents an alkyl substituent and $n$ represents the number of moles of ethylene oxide employed. These non-ionic surfactants include alkylphenoxypoly-(ethyleneoxy)ethanols having alkyl groups containing between about 4 to about 240 ethyleneoxy units, such as the heptylphenoxypoly(ethyleneoxy)ethanols, nonylphenoxypoly(ethyleneoxy)ethanols and dodecylphenoxypoly-(ethyleneoxy)ethanols. Other suitable non-ionic surfactants are the "Tweens," which is a trademark of Atlas Powder Company denoting polyoxyalkylene derivatives of hexitol (including sorbitans, sorbides, mannitans and mannides) anhydride, partial long chain fatty acid esters, such as the polyoxyalkylene derivatives of sorbitan monolaurate, sorbitan monopalmitate, sorbitan monstearate, sorbitan tristearate, sorbitan monooleate and sorbitan trioleate; the "Pluronics," which is a trademark of Wyandotte Chemicals Corporation denoting condensates of ethylene oxide with a hydrophobic base, said base being formed by condensing propylene oxide with propylene glycol; sulfur-containing condensates, e.g., those prepared by condensing ethylene oxide with higher alkyl mercaptans, such as nonyl, dodecyl, or tetradecyl mercaptan, or with alkylthiophenols wherein the alkyl substituent contains from 6 to 15 carbon atoms; ethylene oxide derivatives of long-chain carboxylic acids such as lauric, myristic, palmitic or oleic acid, or mixtures of acids, such as tall oil, and ethylene oxide derivatives of long-chain alcohols such as octyl, decyl, lauryl or cetyl alcohol.

Among the anionic surfactants suitable for use in the present invention are the higher molecular weight sulfates and sulfonates, e.g., sodium and potassium alkyl sulfates, aryl sulfates, and alkylaryl sulfates and sulfonates, including sodium 2-ethylhexyl sulfate, potassium 2-ethylhexyl sulfate, sodium nonyl sulfate, sodium undecyl sulfate, sodium tridecyl sulfate, sodium pentadecyl sulfate, sodium lauryl sulfate, sodium methylbenzene sulfonate, potassium methylbenzene sulfonate, sodium dodecylbenzene sulfonate, potassium toluene sulfonate and sodium xylene sulfonate; higher fatty alcohols, e.g., stearyl alcohol, lauryl alcohol, and the like, which have been ethoxylated and sulfonated; dialkyl esters of alkali metal sulfosuccinic acid salts, e.g., sodium diamyl sulfosuccinate, sodium dihexyl sulfosuccinate and sodium dioctyl sulfosuccinate; and formaldehyde-naphthalenesulfonic acid condensation products.

The monomer pre-emulsion of the present invention, which contains one or more monomers, one or more surfactants, and water, is preferably prepared by first admixing the surfactant or surfactant mixture with water and then adding the monomer or monomer mixture thereto, with stirring. The monomer or monomers should be added to the surfactant-water mixture at a rate such that the monomer pre-emulsion will continuously form, while at the same time avoiding the buildup of unemulsified monomer in the surfactant-water mixture. While the precise rate of addition will vary from system to system, in general the monomer is added more slowly at first and then more rapidly as the preparation progresses.

The term "stable pre-emulsion" as used herein is defined as a monomer pre-emulsion which will maintain its emulsion properties at least long enough to permit addition of the pre-emulsion to the polymerization reaction medium, and preferably as long as 6 months or more.

The total monomer content of the monomer pre-emulsion of the present invention can range from about 75% to about 94% by weight, and preferably from about 75% to about 90% by weight, based on the total weight of the monomer pre-emulsion. It has been discovered that the amount of water employed in preparing monomer pre-emulsions for use in the novel process of the present invention will generally be between about 0.9 mole and about 1.9 moles for each mole of monomer present. This corresponds to between about 6 and about 25 weight percent of water based on the total weight monomer present in the pre-emulsion. Preferably the amount of water ranges from about 10 to about 25 weight percent based on the total monomer present in the pre-emulsion.

The amount of non-ionic or anionic surfactant or mixture thereof employed in preparing the monomer pre-emulsion is generally that amount conventionally employed when emulsifying monomers in an emulsion polymerization process, e.g., an amount ranging from about 1% to about 10% by weight, based on the total weight of the monomer pre-emulsion. However, it is preferred when using typical non-ionic surfactants, e.g., those of the above-described alkylphenoxypoly(ethyleneoxy)ethanols which contain from about 4 to about 240 ethyleneoxy units, or typical anionic surfactants, e.g., and ethoxylated higher fatty alcohol which has also been sulfonated, to employ them in amounts ranging from about 1.5% to about 6% by weight, on the above-stated basis.

As mentioned earlier, aqueous emulsion polymers prepared by the process of the present invention possess sufficiently low viscosities to permit their use in commercial applications while at the same time containing a higher solids content (i.e., polymer content) and having greater shelf stability than heretofore obtainable on a commercial scale. It has been discovered that, for a given monomer surfactant material, the corresponding aqueous polymer emulsion having minimum (and therefore most desirable) viscosity can be predicted by utilizing specific conductivity measurements on the intermediate monomer pre-emulsion. More particularly, when values of specific conductivity are plotted against the water content of the pre-emulsion (for a series of pre-emulsions made from a given monomer-surfactant material but differing in the amounts of water used), the resulting curve exhibits a "break" or inflection point. This "break" occurs at the pre-emulsion composition which, when processed into an emulsion polymer, has minimum viscosity. In other words, there is a direct correspondence between the aforementioned "break" or inflection point on a plot of specific conductivity vs. the amount of water present in the monomer pre-emulsion and the minimum viscosity point on a plot of the amount of water present in the monomer pre-emulsion vs. the viscosity of the polymer emulsion made from the monomer pre-emulsion. However, monomer pre-emulsions made using greater or lesser amounts of water rather than amounts corresponding exactly to those which give the aforementioned break or inflection point in the monomer pre-emulsion specific conductivity curve are generally close enough to the ideal to give satisfactorily high solids coupled with acceptable viscosities in the finished polymer emulsion, provided such amounts of water are between about 6 percent and about 25 percent of the total weight of monomer in the pre-emulsion.

As used herein, specific conductivity, which is the reciprocal of resistivity, is that quantity of electricity transferred across a unit volume of monomer pre-emulsion per unit potential gradient (see Glasstone, An Introduction to Electrochemistry, Chapter II, pp. 29–30, D. Van Nostrand Company, Inc., New York 1942). One convenient method of measuring specific conductivity, and the method used herein, is by means of a Leeds & Northrup Model No. 4866 Conductivity Bridge using a glass dip cell having a cell constant of 0.84. The selection of the cell constant is largely dependent upon the specific conductivity to be determined. Thus, for example, a cell constant of about 1.0 is recommended for specific conductivities ranging from 5 to 4,000 micromhos/cm. In order to obtain reproducibility of conductivity values it is necessary that a good grade of deionized water be used in preparing the monomer pre-emulsions whose specific conductivities are being measured, although it is not essential that this be done once the particular amount of water for a given monomer pre-emulsion has been determined. Also, conductivities should be determined on freshly prepared monomer pre-emulsions, since experiments show that the same specific conductivity values will not be obtained if the monomer pre-emulsion is allowed to stand for 24 hours, and the expected breaks or inflection points on the plot of specific conductivity vs. monomer pre-emulsion water content are not present if the monomer pre-emulsion is allowed to age overnight. It is not necessary, however, to deaerate the monomer pre-emulsion to obtain reasonably accurate specific conductivity values. In practice, it is found that cutting off about one half of the glass shield enclosing the platinum electrodes of the conductivity bridge more readily exposes the electrodes to the relativity thick monomer pre-emulsions, and facilitates more rapid and accurate specific conductivity determinations.

Aside from the surfactant or surfactant mixture employed, the monomer pre-emulsion monomer material to be used in making the pre-emulsion can also contain small amounts of one or more protective colloids, particularly when a reflux-type polymerization is carried out using vinyl acetate or the like as part of the monomer charge. Included among such materials are ether linkage-containing protective colloids, such as hydroxymethyl cellulose, hydroxyethyl cellulose, ethylhydroxyethyl cellulose, carboxymethyl cellulose, ethoxylated starch derivatives, and the like. However, other protective colloid-forming substances, i.e., those containing no ether linkages, can also be used either alone or together with the aforementioned ether linkage-containing materials, and included among these are partially and fully hydrolyzed polyvinyl alcohols, polyacrylic acid, sodium and other alkali metal polyacrylates, polyacrylamide, poly(methylvinyl ether/maleic anhydride), polyvinylpyrrolidone, water-soluble starch, glue, gelatin, water-soluble aliginates such as sodium or potassium alginate, casein, agar, and natural and synthetic gums, such as gum arabic and gum tragacanth. All of these materials can be used in amounts conventionally used in emulsion polymerization procedures, i.e., in amounts usually ranging from about 0.1% to about 2% by weight of the polymer emulsion.

No particular elevated or lowered temperature or temperature range is required when preparing the monomer pre-emulsions of the present invention. In fact, in most if not all cases the monomer pre-emulsion is preferably prepared at or near ambient temperature, i.e., between about 10° C. and about 40° C.

The monomer or monomers in the pre-emulsion are polymerized by means of a catalytic amount of a conventional free radical polymerization catalyst or catalyst system (which can be referred to as an addition polymerization catalyst, a vinyl polymerization catalyst or a polymerization initiator). Preferably, although not necessarily, the polymerization catalyst is substantially water-soluble and soluble in the polymerization reaction mixture. Among such catalysts are inorganic peroxides such as hydrogen peroxide, alkali metal persulfates (e.g., sodium, potassium, and lithium persulfates) and ammonium persulfates, perphosphates and perborates, azonitriles, such as alpha, alpha-azo-bis-isobutyronitrile, and redox systems, including such combinations as mixtures of halogen peroxide, tert-butyl hydroperoxide, or the like and any of an iron salt, a titanous salt, zinc formaldehyde sulfoxylate or sodium formaldehyde sulfoxylate; ammonium or alkali metal persulfates, borates or perchlorates together with an alkali metal bisulfite such as sodium metabisulfite; an alkali metal persulfate together with an arylphosphinic acid such as benzenephosphinic acid, and the like.

In accordance with conventional practice, the amount of polymerization catalyst employed is generally no more than that required to obtain substantially complete monomer conversion at lowest catalyst cost. Thus, for example, from about 0.3% to about 0.5% by weight, of a perchlorate such as ammonium perchlorate together with an approximately equal amount of a bisulfite such as sodium metabisulfite, and preferably about 0.4% by weight of the perchlorate together with about 0.4% by weight of the bisulfite, each of these weight percentages being based on the total weight of the monomer pre-emulsion, can be employed.

There is no criticality in the total amount of polymerization caatlyst used, other than that an amount sufficient to ensure substantially complete conversion should be employed. However, it is preferred, in order to also ensure good conversion to stable polymer emulsions having optimum solids content, that at least about 10% of the total amount of catalyst employed, and preferably from about 15% to about 20%, be present in the water to which the monomer pre-emulsion is added prior to the addition of the first amount of the monomer pre-emulsion.

It is also possible, when using redox catalyst systems, to dissolve the oxidant, e.g., ammonium persulfate, in the surfactant-water mixture prior to the preparation of the monomer pre-emulsion, and to then add the reductant, e.g., a ferrous salt, together with the oxidant-containing monomer pre-emulsion, to the water in which polymerization to form the emulsion polymer takes place.

As indicated hereinabove, the polymerization step of the novel process of the present invention is carried out by incrementally or continuously adding the pre-emulsion to water, and preferably simultaneously adding the remainder of the catalyst or catalyst system.

The amount of water to which the pre-emulsion is added will be determined by the solids content desired in the finished polymer emulsion. Thus, for example, when preparing a 70% solids polymer emulsion, the total amount of water present in the system (water from the monomer pre-emulsion, the catalyst, and even, in some cases, from the surfactant) will constitute about 30% by weight of the entire polymer emulsion; for a 60% solids polymer emulsion, 40% by weight of the entire emulsion will be water, etc.

The polymerization temperature will generally range from about room temperature (i.e., ambient temperature) or lower to about 80° C. or above, and preferably from about 20° C. to about 60° C. This temperature can be varied as the polymerization proceeds towards substantial completion. Subatmospheric, atmospheric or superatmospheric pressures can be employed during all or part of the polymerization. Depending on the monomers and catalyst employed, the reaction can be carried out, if desired, under an inert atmosphere, e.g., under an atmosphere of nitrogen, argon, or carbon dioxide. Thus, for example, polymerizations carried out at temperatures of 10° C. below the boiling point of the lowest boiling monomer present, or higher, are conveniently conducted in an inert atmosphere under superatmospheric pressure.

The time during which the monomer pre-emulsion and the catalyst are added to the water (in which polymerization is to occur), as well as the total reaction time, can vary to a considerable extent depending on such factors as the temperatures and pressures employed, the monomers and catalysts involved, the percent conversion and percent solids desired, and so forth. In general, however, the monomer pre-emulsion is added to the water at a rate such that polymerization continuously takes place without unreacted monomer buildup. This can be accomplished, for example, by adding the monomer pre-emulsion to the water over a period of from about 2 to about 8 hours or more, and preferably from about 4 to about 6 hours, together with the catalyst, the latter usually being dissolved in water at concentrations ranging from about 3% to about 12% by weight, based on the total weight of the catalyst solution. The catalyst is conveniently added concurrently with the monomer pre-emulsion, i.e., if the monomer pre-emulsion is added over a 6-hour period, the catalyst solution is introduced approximately over the same period of time. However, small amounts of the catalyst solution can be added subsequent to the introduction of the last of the monoemr pre-emulsion to ensure substantially complete polymerization, particularly where small amounts, e.g., up to about 0.5% by weight, based on the total weight of monomers present, of odorous monomers such as ethyl acrylate, butyl acrylate, and the like are apt to remain unpolymerized.

Following the addition of the last of the monomer pre-emulsion and catalyst, the polymer emulsion can be processed in any conventional manner. Generally, it is treated with base, e.g., aqueous sodium hydroxide or ammonium hydroxide, to neutralize any acidic material present, such as unreacted acidic monomers or catalyst residues. Preferably, enough base is added, with stirring, over a period of from about 30 to about 90 minutes, to reach and maintain a pH of from about 7.5 to about 10, and preferably from about 8 to about 9. The neutralized emulsions are usually allowed to cool to room temperature and then filtered, if necessary, before being used.

Besides being useful in paint compositions, the novel high solids-containing polymer emulsions prepared by the novel method of the present invention are useful in the continuous formation of films, due to the fact that these low water content emulsions can be dried rapidly. They can also be used in producing elastomers, crosslinkable sealants and adhesives, in making foams, and in emulsion spinning process. Furthermore, monomer pre-emulsions having very high monomer content, e.g., in the order of from about 65% to about 70% or more, are particularly suited for continuous emulsion processes, wherein the monomer pre-emulsion is pushed through and polymerized in a heated reactor, and the finished polymer emulsion is extruded from the exit end of the reactor like toothpaste coming from a tube.

The term "workable viscosities" or "acceptable viscosities" as used herein defines that range of viscosities of the high solids polymer emulsions within which the formulator or user of the polymer emulsion can effectively work, i.e., in blending, pumping, pouring, and the like operations. These ranges include viscosities slightly higher than that of water up to as high as 20,000 centipoises. In some instances, the preferred viscosity varies from 50 to 5,000 centipoises. The terms "shelf stable polymer emulsions" and "stable latex polymers" as used herein denote emulsion polymer products which maintain their emulsion properties for a minimum of 1 day, preferably as long as 6 months and longer.

An additional essentially unexplained phenomenon associated with the polymer emulsions, and particularly acryilc polymer emulsions, prepared by the novel process of the present invention is that they are generally pearlescent and highly colored in appearance, exhibiting all colors of the visual spectrum with intensities depending on the type of illumination and angle of observation.

DESCRIPTION OF THE PREFERRED EMBODIMENTS

In order that those skilled in the art can more fully understand the present invention, the following examples are provided. These examples are intended solely for the purpose of illustrating the invention, and are not to be construed as expressing limitations unless so set forth in the appended claims. All parts and percentages are by weight, unless otherwise stated.

In making the viscosity measurements reported in the examples, a Model RVA Brookfield Viscometer was used, and the determinations were made on deaerated samples, which are allowed to stand for a few days until the initially high viscosity stabilized at a lower viscosity level. In all cases, however, viscosity measurements are made before settling occurs.

EXAMPLE 1

A monomer pre-emulsion is prepared by admixing the following materials at room temperature, with stirring:

| Component: | Parts |
| --- | --- |
| Ethyl acrylate | 370.8 |
| Methyl methacrylate | 198.4 |
| Abex 18-S (surfactant produced by Alcolac Chemical Corporation; and ethoxylated higher fatty alcohol which has been sulfonated with chlorosulfonic acid and neutralized with sodium hydroxide; molecular weight=2,000–2,500; solids content=33.5 percent) | 23.0 |
| Abex 26-S (surfactant produced by Alcolac Chemical Corporation; similar in composition and molecular weight to Abex 18-S) | 47.0 |
| Deionized water | 55.8 |

Two catalyst solutions, the first containing 4 parts of ammonium persulfate in 60 parts of deionized water and the second containing 4 parts of sodium metabisulfite in 60 parts of deionized water, are also prepared.

Next, 177.0 parts of deionized water are introduced into a reaction vessel under a nitrogen atmosphere, heated at 80° C. for thirty minutes, with stirring, and then cooled to 50° C. Ten parts of each of the aforementioned catalyst solutions are then added to the reaction vessel, following which the addition of the above-prepared monomer pre-emulsion and remaining catalyst solutions is begun, with the former being added at a rate of 180 parts per hour and the catalyst solutions each at a rate of 12 parts per hour. During these additions, and for 1 hour after they are completed, stirring is maintained and the temperature of the polymerization mixture is held at 50° C. The pre-emulsion is consumed at a rate equal to the rate of addition thereof. Finally, the emulsion is allowed to cool to room temperature, and is then adjusted to a pH of about 8.5 with aqueous ammonium hydroxide.

The thus-obtained polymer emulsion has the following characteristics:

| | |
| --- | --- |
| Solids content | 60%. |
| Viscosity | 200 centipoises (hereinafter cps.). |
| Mechanical stability (minutes in Waring Blender) | 2 minutes. |
| Settling time | Indefinite (no settling after 120 days). |
| Film clarity | Clear. |
| Inherent viscosity (0.1% by weight in acetic acid at 25° C.) | 1.42. |
| Particle size (Label method) | 0.38 micron. |

EXAMPLE 2

The procedure of Example 1 is repeated in every detail except as indicated below.

The monomer pre-emulsion is prepared using:

| Component: | Parts |
| --- | --- |
| Ethyl acrylate | 403.3 |
| Methyl methacrylate | 215.9 |
| Abex 18–S | 23.0 |
| Abex 26–S | 47.0 |
| Deionized water | 64.8 |

The thus-prepared monomer pre-emulsion is added to 118.0 parts of deionized water, rather than to the aforementioned 177.0 parts.

The thus-obtained polymer emulsion has the following characteristics:

| | |
| --- | --- |
| Solids content | 65%. |
| Viscosity | 17,000 cps. |
| Settling time | Indefinite. |
| Film clarity | Clear. |

Example 3

The procedure of Example 1 is again repeated in every detail except as indicated below.

The monomer pre-emulsion was made using:

| Component: | Parts |
| --- | --- |
| Ethyl acrylate | 370.6 |
| Methyl metacrylate | 198.4 |
| Triton X-200 (surfactant produced by Rohm & Haas Co.; a sodium octylphenyl polyether sulfonate containing 2–3 ethyleneoxy units; 28% solids) | 82.1 |
| Deionized water | 43.2 |

The thus-prepared monomer pre-emulsion is added to 185.8 parts of deionized water. The thus-obtained polymer emulsion has the following characteristics:

| | |
| --- | --- |
| Solids content | 60%. |
| Viscosity | 75 cps. |
| Settling time | 170 days. |
| Film clarity | Clear. |

Example 4

The procedure of Example 3 is repeated in every detail except as indicated below.

The monomer pre-emulsion is made using:

| Component: | Parts |
| --- | --- |
| Ethyl acrylate | 436.0 |
| Methyl methacrylate | 233.0 |
| Triton X-200 | 82.1 |
| Deionized water | 61.2 |

The catalyst solutions used contain 4 parts of ammonium persulfate in 30 parts of deionized water and 4 parts of sodium metabisulfite in 30 parts of deionized water.

The monomer pre-emulsion is added to 119.7 parts of deionized water, to which 5 parts of each of the aforementioned catalyst solutions had previously been added.

The thus-obtained polymer emulsion has the following characteristics:

| | |
| --- | --- |
| Solids content | 70%. |
| Viscosity | 800 cps. |
| Settling time | 270 days. |
| Film clarity | Clear. |

Example 5

The procedure of Example 3 is again repeated in every detail except as indicated below.

The monomer pre-emulsion is made using:

| Component: | Parts |
| --- | --- |
| Ethyl acrylate | 468.6 |
| Methyl methacrylate | 250.4 |
| Triton X-200 | 82.1 |
| Deionized water | 70.2 |

The catalyst solutions used contain 4 parts of ammonium persulfate in 35 parts of deionized water and 4 parts of sodium metabisulfite in 35 parts of deionized water.

The monomer pre-emulsion is added to 50.7 parts of deionized water, to which 5 parts of each of the aforementioned catalyst solutions had previously been added.

The thus-obtained polymer emulsion has the following characteristics:

| | |
| --- | --- |
| Solids content | 75%. |
| Viscosity | 15,000 cps. |
| Settling time | 270 days. |
| Film clarity | Clear. |

Example 6

The procedure of Example 1 hereinabove is again repeated in every detail except as indicated below.

The monomer pre-emulsion was made using:

| Component: | Parts |
|---|---|
| Vinyl acetate | 489.1 |
| Ethyl acrylate | 91.8 |
| Dioctyl maleate | 30.7 |
| Abex 18-S | 30.7 |
| Abex 26-S | 62.7 |
| Deionized water | 58.3 |

The catalyst solutions used contain 4 parts of ammonium persulfate in 30 parts of deionized water and 4 parts of sodium metabisulfite in 30 parts of deionized water.

The monomer pre-emulsion is added to 168.7 parts of deionized water, to which 5 parts of each of the aforementioned catalyst solutions had previously been added.

The thus-obtained polymer emulsion has the following characteristics:

| | |
|---|---|
| Solids content | 65%. |
| Viscosity | 16,000 cps. |
| Settling time | Indefinite. |
| Film clarity | Clear. |

Example 7

The procedure of Example 1 is again repeated in every detail except as indicated below.

The monomer pre-emulsion was made using:

| Component: | Parts |
|---|---|
| Ethyl acrylate | 370.8 |
| Methyl methacrylate | 198.4 |
| Triton X-405 (surfactant produced by Rohm & Haas Co.; an octylphenyl polyether alcohol containing 40 ethyleneoxy units; 70% solids) | 32.6 |
| Deionized water | 78.9 |

The monomer pre-emulsion is added to 191.3 parts of deionized water.

The thus-obtained polymer emulsion has the following characteristics:

| | |
|---|---|
| Solids content | 60%. |
| Viscosity | 105 cps. |
| Mechanical stability (time in Waring Blendor) | 10 minutes. |
| Settling time | clear. |

Example 8

The procedure of Example 7 is repeated in every detail except as indicated below.

The monomer pre-emulsion is made using:

| Component: | Parts |
|---|---|
| Ethyl acrylate | 433.4 |
| Methyl methacrylate | 231.9 |
| Triton X-405 | 38.1 |
| Deionized water | 108.0 |

The catalyst solutions used contain 4 parts of ammonium persulfate in 30 parts of deionized water and 4 parts of sodium metabisulfite in 30 parts of deionized water.

The monomer pre-emulsion is added to 120.6 parts of deionized water, to which 5 parts of each of the aforementioned catalyst solutions had previously been added.

The thus-obtained polymer emulsion has the following characteristics:

| | |
|---|---|
| Solids content | 70%. |
| Viscosity | 7,000 cps. |
| Settling time | Indefinite. |
| Film clarity | Clear. |

Example 9

A monomer pre-emulsion is prepared by admixing the following materials at room temperature, with stirring:

| Component: | Parts, grams |
|---|---|
| Vinyl acetate | 598.3 |
| Surfactants: | |
| Igepal CO 897 [1] | 22.5 |
| Igepal CO 630 [2] | 2.7 |
| Deionized water | 140.3 |
| Hydroxy methyl cellulose | 5.0 |

[1] Igepal CO 630 is a trademark of General Aniline and Film Corporation denoting the reaction product of nonyl phenol and ethylene oxide wherein 9 moles of ethylene oxide are added per mole of nonyl phenol to produce a non-ionic surfactant; 100% solids.
[2] Igepal CO 897 is a product similar to Igepal CO 630 but having 40 moles ethylene oxide; 70% solids.

A catalyst solution containing 4 grams of ammonium persulfate and 120 grams of water is also prepared.

The reaction medium contains 80 grams of water and 20 grams of the ammonium persulfate solution. The reaction medium was heated to 75° C. and maintained thereat. The pre-emulsion and remaining catalyst solution are added separately to the reaction medium continuously and at a uniform rate over a period of 4 hours.

The latex polymer obtained has the following properties:

| | |
|---|---|
| Solids content | 62.7%. |
| Viscosity | 90 cps. |

Example 10

A monomer pre-emulsion is prepared by admixing the following materials at room temperature, with stirring:

| Component: | Parts, grams |
|---|---|
| Vinyl acetate | 538.6 |
| Di-octyl maleate | 95.1 |
| Abex 18-S | 9.3 |
| Abex 26-S | 15.6 |
| Deionized water | 106.7 |

Two catalyst solutions, the first containing 4 grams of ammonium persulfate (catalyst) in 60 grams of deionized water and the second containing 4 grams of sodium metabisulfite (activator) in 60 grams of deionized water, are also prepared.

Next, 106.7 grams of deionized water are introduced into a reaction vessel with stirring, and heated to 50° C. Ten grams of each of the aforementioned catalyst solutions are then added to the reaction vessel, followed by the addition of the above-prepared monomer pre-emulsion and remaining catalyst solutions, each in separate continuous streams. The rate of addition of each of these streams is uniformly controlled to provide an addition time of about 4 hours. During these additions and for 1 hour thereafter, stirring is continued and the temperature of the polymerization mixture is held at about 50° C. Finally, the reaction system is allowed to cool to room temperature.

The resulting polymer emulsion has the following characteristics:

| | |
|---|---|
| Solids content | 63.9%. |
| Viscosity | 4,600 cps. |
| Inherent viscosity | 1.53. |

Example 11

A monomer pre-emulsion is prepared by admixing the following materials at room temperature with stirring:

| Component: | Parts |
|---|---|
| Chloroprene (re-distilled) | 144 |
| Triton X-200 | 20.5 |
| Deionized water | 6 |

Two catalyst solutions, the first containing 2 parts of potassium metabisulfite in 5 parts of deionized water and the second containing 0.5 parts of potassium persulfate 10 parts of deionized water, are also prepared.

Next, 40 parts of deionized water and 1 part solid potassium persulfate are charged into a reaction vessel and heated, with stirring, to 38° C. Ten parts of each of the above-prepared catalyst solutions are then added to the reaction vessel, followed by the addition of the monomer pre-emulsion and remaining catalyst solutions, each in separate, continuous streams. The rate of addition of each of these streams is uniformly controlled to provide an addition time of about 1.5 hours. During these additions, and for 1 hour thereafter, stirring is continued and the temperature is maintained at a temperature of between about 37° C. and about 40° C. to ensure 100 percent conversion. Finally, the reaction system is allowed to cool to room temperature and neutralized with aqueous sodium bicarbonate.

The resulting polymer emulsion has the following properties:

| | |
|---|---|
| Solids content | 65%. |
| Viscosity | 260 cps. |
| Settling time | Indefinite. |
| Film clarity | Clear. |

I claim:

1. A process for producing a high solids aqueous polymer emulsion from corresponding monomer, which process comprises:
   (a) forming an aqueous monomer pre-emulsion by admixing:
      (1) at least one olefinically unsaturated polymerizable monomer capable of forming a stable aqueous emulsion;
      (2) an amount of water corresponding to between about 6% by weight and about 25% by weight based on the total weight of said monomer; and
      (3) a non-ionic or anionic surfactant in an amount sufficient to emulsify said monomer and the polymer subsequently formed therefrom;
   (b) adding the pre-emulsion to a polymerization reaction medium initially comprising:
      (1) a free radical polymerization catalyst in an amount at least sufficient to initiate the polymerization of at least one of the monomers in the pre-emulsion; and
      (2) an amount of water required to obtain a solids content in the aqueous polymer emulsion of between about 50% by weight and about 75% by weight of the polymer emulsion
   together with a free radical polymerization catalyst in an amount sufficient to provide substantially complete polymerization of the monomer;
   (c) maintaining the rate of addition of pre-emulsion in step (b) to provide a substantially complete conversion of the polymerizable monomer to polymer as the pre-emulsion is added to the polymerization reaction medium; and
   (d) maintaining the reaction medium in step (b) at a temperature to initiate and continue the polymerization reaction to produce an aqueous polymer emulsion of workable viscosity and shelf stability and having total solids content between about 50% by weight and about 75% by weight based on the total weight of the polymer emulsion.

2. The process of claim 1 wherein:
the amount of water used in step (a) corresponds to between about 10% by weight and about 25% by weight based on the total weight of said monomer;
the amount of water in step (b) corresponds to a solids content in the aqueous polymer emulsion of between about 60% by weight and about 75% by weight based on the total weight of the polymer emulsion;
the polymerization reaction medium prior to the addition of the pre-emulsion contains at least about 10% of the total amount of free radical polymerization catalyst; and
said free radical polymerization catalyst is substantially soluble in the polymerization reaction medium.

3. The process of claim 2 wherein:
step (a) is performed at a temperature of between about 10° C. and about 40° C.; and
step (b) is performed at a temperature of between about 20° C. and about 60° C.

4. The process of claim 3 wherein a cross-linking monomer in an amount between about 0.01% by weight and about 6% by weight, based on the total weight of monomer, is admixed in step (a).

5. The process of claim 1 wherein the polymerizable monomer provides a homopolymer.

6. The process of claim 5 wherein the homopolymer is an acrylic polymer.

7. The process of claim 5 wherein the polymerizable monomer is ethyl acrylate or methyl methacrylate.

8. The process of claim 7 wherein:
the amount of water used in step (a) corresponds to between about 10% by weight and about 25% by weight based on the total weight of said monomer;
the amount of water in step (b) corresponds to a solids content in the aqueous polymer emulsion of between about 60% by weight and about 75% by weight based on the total weight of the polymer emulsion;
the polymerization reaction medium prior to the addition of the pre-emulsion contains at least about 10% of the total amount of free radical polymerization catalyst; and
said free radical polymerization catalyst is substantially soluble in the polymerization reaction medium.

9. The process of claim 8 wherein:
step (a) is performed at a temperature of between about 10° C. and about 40° C.; and
step (b) is performed at a temperature of between about 20° C. and about 60° C.

10. The process of claim 5 wherein the polymerizable monomer is vinyl acetate.

11. The process of claim 10 where:
the amount of water used in step (a) corresponds to between about 10% by weight and about 25% by weight based on the total weight of said monomer:
the amount of water in step (b) corresponds to a solids content in the aqueous polymer emulsion of between about 60% by weight and about 75% by weight based on the total weight of the polymer emulsion;
the polymerization reaction medium prior to the addition of the pre-emulsion contains at least about 10% of the total amount of free radical polymerization catalyst; and
said free radical polymerization catalyst is substantially soluble in the polymerization reaction medium.

12. The process of claim 11 wherein:
step (a) is performed at a temperature of between about 10° C. and about 40° C.; and
step (b) is performed at a temperature of between about 20° C. and about 60° C.

13. The process of claim 5 wherein the homopolymer is a synthetic rubber.

14. The process of claim 13 wherein the polymerizable monomer is chloropene.

15. The process of claim 14 wherein:
the amount of water used in step (a) corresponds to between about 10% by weight and about 25% by weight based on the total weight of said monomer;
the amount of water in step (b) corresponds to a solids content in the aqueous polymer emulsion of between about 60% by weight and about 75% by weight based on the total weight of the polymer emulsion;
the polymerization reaction medium prior to the addition of the pre-emulsion contains at least about 10% of the total amount of free radical polymerization catalyst; and
said free radical polymerization catalyst is substantially soluble in the polymerization reaction medium.

16. The process of claim 15 wherein:
step (a) is performed at a temperature of between about 10° C. and about 40° C.; and
step (b) is performed at a temperature of between about 20° C. and about 60° C.

17. The process of claim 16 wherein a cross-linking monomer in an amount between about 0.01% by weight and about 6% by weight, based on the total weight of monomer, is admixed in step (a).

18. The process of claim 1 wherein a plurality of monomers is used in step (a) to provide a copolymer.

19. The process of claim 18 wherein one of the monomers is vinyl acetate.

20. The process of claim 19 wherein one of the monomers is ethyl acrylate, methyl methacrylate, di-octyl maleate, or chloroprene.

21. The process of claim 20 wherein:
the amount of water used in step (a) corresponds to between about 10% by weight and about 25% by weight based on the total weight of said monomer;
the amount of water in step (b) corresponds to a solids content in the aqueous polymer emulsion of between about 60% by weight based on the total weight of the polymer emulsion;
the polymerization reaction medium prior to the addition of the pre-emulsion contains at least about 10% of the total amount of free radical polymerization catalyst; and
said free radical polymerization catalyst is substantially soluble in the polymerization reaction medium.

22. The process of claim 21 wherein:
step (a) is performed at a temperature of between about 10° C. and about 40° C.; and
step (b) is performed at a temperature of between about 20° C. and about 60° C.

23. The process of claim 22 wherein a cross-linking monomer in an amount between about 0.01% by weight and about 6% by weight, based on the total weight of monomer, is admixed in step (a).

24. The process of claim 18 wherein the copolymer is an acrylic copolymer.

25. The process of claim 24 wherein one of the monomers is an alkyl acrylate or alkyl methacrylate.

26. The process of claim 25 wherein the copolymer contains at least about 50% by weight, based on the total weight of the monomers employed, of ethyl acrylate or methyl methacrylate.

27. The process of claim 26 wherein:
the amount of water used in step (a) corresponds to between about 10% by weight and about 25% by weight based on the total weight of said monomer;
the amount of water in step (b) corresponds to a solids content in the aqueous polymer emulsion of between about 60% by weight and about 75% by weight based on the total weight of the polymer emulsion;
the polymerization reaction medium prior to the addition of the pre-emulsion contains at least about 10% of the total amount of free radical polymerization catalyst; and
said free radical polymerization catalyst is substantially soluble in the polymerization reaction medium.

28. The process of claim 27 wherein:
step (a) is performed at a temperature of between about 10° C. and about 40° C.; and
step (b) is performed at a temperature of between about 20° C. and about 60° C.

29. The process of claim 18 wherein the pre-emulsion contains butadiene and styrene, said styrene being present in an amount up to about 50% by weight, based on the total weight of the monomers employed.

30. The process of claim 29 wherein:
the amount of water used in step (a) corresponds to between about 10% by weight and about 25% by weight based on the total weight of said monomer;
the amount of water in step (b) corresponds to a solids content in the aqueous polymer emulsion of between about 60% by weight and about 75% by weight based on the total weight of the polymer emulsion;
the polymerization reaction medium prior to the addition of the pre-emulsion contains at least about 10% of the total amount of free radical polymerization catalyst; and
said free radical polymerization catalyst is substantially soluble in the polymerization reaction medium.

31. The process of claim 30 wherein:
step (a) is performed at a temperature of between about 10° C. and about 40° C.; and
step (b) is performed at a temperature of between about 20° C. and about 60° C.

32. The process of claim 31 wherein a cross-linking monomer in an amount between about 0.01% by weight and about 6% by weight, based on the total weight of monomer, is admixed in step (a).

References Cited
UNITED STATES PATENTS

| | | | |
|---|---|---|---|
| 2,655,496 | 10/1953 | Adams | 260—29.6 |
| 2,761,853 | 9/1956 | Uraneck et al. | 260—29.7 |
| 3,255,127 | 6/1966 | Von Bonin et al. | 260—29.6 |
| 3,324,056 | 6/1967 | Vona et al. | 260—29.6 |
| 3,328,330 | 6/1967 | Trifimow et al. | 260—29.6 |
| 3,424,706 | 1/1969 | Smith et al. | 260—29.6 |
| 3,477,980 | 11/1969 | Daniels | 260—29.6 |

HAROLD D. ANDERSON, Primary Examiner

U.S. Cl. X.R.

260—8, 17A, 17.4 ST, 23.5 R, 23.7 R, 23.7 BB, 29.6 RW, 29.6 WA, 29.7 R, 95 R